United States Patent
Kim (10) Patent No.: US 11,947,866 B2
(45) Date of Patent: Apr. 2, 2024

(54) SPACE MONITORING APPARATUS USING SOUND SIGNAL AND SPACE MONITORING METHOD THEREOF

(71) Applicant: Jae Whan Kim, Seoul (KR)

(72) Inventor: Jae Whan Kim, Seoul (KR)

( * ) Notice: Subject to any disclaimer, the term of this patent is extended or adjusted under 35 U.S.C. 154(b) by 337 days.

(21) Appl. No.: 17/495,790

(22) Filed: Oct. 6, 2021

(65) Prior Publication Data

US 2023/0106155 A1 Apr. 6, 2023

(51) Int. Cl.
*G06F 3/16* (2006.01)
*G10K 15/02* (2006.01)

(52) U.S. Cl.
CPC ............. *G06F 3/165* (2013.01); *G10K 15/02* (2013.01)

(58) Field of Classification Search
None
See application file for complete search history.

(56) References Cited

U.S. PATENT DOCUMENTS

2015/0279181 A1* 10/2015 Park ................... G08B 13/1672
367/136
2021/0127203 A1* 4/2021 Macours ................ H03F 3/183

* cited by examiner

*Primary Examiner* — Walter F Briney, III (57) ABSTRACT

Proposed is a space monitoring apparatus using a sound signal and a space monitoring method thereof and, more specifically, is a technology in which a space monitoring apparatus using a sound to determine a spatial condition sets a synthesized sound having a plurality of frequency components to utilize the performance of a speaker efficiently and emits the synthesized sound to monitor the spatial condition.

8 Claims, 9 Drawing Sheets

SPACE MONITORING APPARATUS USING SOUND SIGNAL AND SPACE MONITORING METHOD THEREOF

BACKGROUND OF THE INVENTION

Field of the Invention

The present disclosure relates to a space monitoring apparatus using a sound signal and a space monitoring method thereof and, more specifically, to a technology in which a space monitoring apparatus using a sound to determine a spatial condition sets a synthesized sound having a plurality of frequency components to utilize the performance of a speaker efficiently and emits the synthesized sound to monitor the spatial condition.

Description of the Related Art

Various detection sensors and devices are being used to detect an intrusion of an outsider into an indoor space, a fire occurrence, a gas leak, and the like. Recently, with the development of IoT technology, a system capable of detecting various conditions, such as whether heating or cooling is operated in an indoor space and whether a window is open, from a remote location and taking follow-up actions according to a detection result is being built.

In general, a CCTV, an IR camera, a vibration detection sensor, a gas detection sensor, and the like are applied to these various detection technologies. In the case of the prior art, since individual sensing devices are required for each condition, such as intrusion, fire, gas, and the like, a large number of sensing devices are required to monitor various indoor spatial conditions. Accordingly, cost is significantly consumed to construct a facility and power consumption is also a significant problem.

To solve the above problems, a technique for emitting a sound signal and determining an indoor spatial condition on the basis of a change in the sound signal has been recently proposed.

A frequency response sensor (FRS) or a sound field sensor is one of the devices for determining a spatial condition on the basis of sound.

The frequency response of a predetermined space may be described as follows. When a target space is regarded as a kind of a closed circuit, a sound signal having a plurality of frequencies is emitted to the target space as an input signal, and a sound signal is received as an output signal, in this case, sound pressure or phase for each frequency of the received sound signal may be defined as 'frequency response of a space'. For example, the frequency response of a space may be displayed as a graph with frequency as a horizontal axis and sound pressure or phase of the received sound as a vertical axis.

Since the frequency response of a space varies depending on physical characteristics of the space, a change in physical characteristics of the space may be identified by using the frequency response of space or a pattern in which the frequency response of space changes.

To measure the frequency response of a space, for example, a synthesized sound may be used by using a plurality of sound sources having the same amplitude as 1 volt and different frequencies. As an example, it is assumed that a synthesized sound is generated by using 15 sound sources with a frequency difference of 4 Hz starting from 4,000 Hz, and the sound is emitted from a speaker by using the synthesized sound. Further, it is assumed that a maximum allowable peak voltage for the performance of the speaker is 1 volt.

Figure 1:
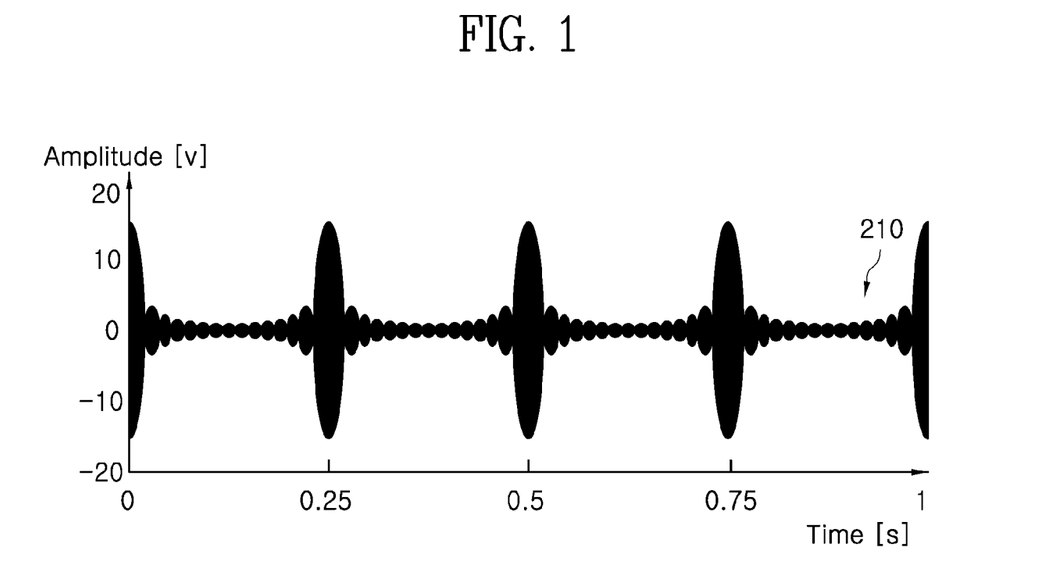
FIG. 1 is a view illustrating a waveform of an embodiment for a synthesized sound having a plurality of frequency components.

When 15 sound sources having an amplitude of 1 volt are synthesized, it can be expressed as a waveform of the synthesized sound 210 as illustrated in FIG. 1. The synthesized sound generated by adding all 15 sound sources with different frequencies but with the same phase has a maximum amplitude of 15 volts, which is 15 times the amplitude of the individual frequencies due to mutual interference caused by a beat phenomenon.

However, since the maximum amplitude allowed by the speaker is 1 volt, to emit a sound using the synthesized sound of FIG. 1, the synthesized sound of FIG. 1 must be multiplied by $\frac{1}{15}$ and then emitted with the speaker. Therefore, in the sound emitted from the speaker, in terms of individual frequency components, the amplitude of each individual frequency is $\frac{1}{15}$ volts. That is, in terms of individual frequencies of the synthesized sound, there is a problem in that the output performance of the speaker cannot be fully utilized.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problem occurring in the related art, and the present disclosure is intended to provide a method in which a sound signal to be emitted is set to use a speaker performance efficiently in terms of individual frequencies of a synthesized sound so that a target space may be correctly monitored.

The objective of the present disclosure is not limited to the above, and other objectives and advantages of the present disclosure not mentioned can be understood by the following description.

An embodiment of a space monitoring method according to the present disclosure may include: emitting a sound signal, which uses a synthesized sound obtained by synthesizing a plurality of sound sources having difference frequencies to emit a sound signal to a target space; receiving a sound signal, which receives a sound signal of the target space; measuring a frequency response, which measures a frequency response of a space on the basis of the received sound signal; and determining a spatial condition, which determines a condition of the target space on the basis of the measured frequency response of the space.

As an example, the emitting the sound signal may set a plurality of sound sources to allow the plurality of sound sources to have different phases and may set the synthesized sound obtained by synthesizing the plurality of sound sources as an emission sound signal.

Preferably, the emitting the sound signal may set the plurality of sound sources so that an arrangement of a phase difference between the sound sources forms an arithmetic progression when the plurality of sound sources are arranged in a phase order.

Moreover, the emitting the sound signal may set the plurality of sound sources so that a sum of the phase difference between the sound sources is an integer multiple of 180 angular degrees when the plurality of sound sources are arranged in a phase order.

As an example, the emitting the sound signal may include: generating a first synthesized sound obtained by synthesizing the plurality of sound sources having different frequencies; generating a second synthesized sound by selecting a section from a range in which an amplitude of the first synthesized sound is smaller than a reference value; and setting the emission sound signal by using the second synthesized sound.

An embodiment of a space monitoring apparatus using a sound according to the present disclosure may include: a sound signal emitting means configured to generate a synthesized sound obtained by synthesizing a plurality of sound sources having different frequencies to emit the sound signal to a target space; and a spatial condition detection means configured to receive the sound signal of the target space to measure a frequency response of the target space and configured to determine a condition of the target space on the basis of the measured frequency response of the target space.

As an example, the sound signal emitting means may set the plurality of sound sources to allow the plurality of sound sources to have different phases and may use a synthesized sound obtained by synthesizing the plurality of sound sources to set the emission sound signal and to emit the emission sound signal to the target space.

Preferably, the sound signal emitting means may set the plurality of sound sources so that an arrangement of phase difference between the sound sources forms an arithmetic progression when the plurality of sound sources are arranged in a phase order.

Moreover, the sound signal emitting means may set the plurality of sound sources so that a sum of the phase difference between the sound sources is an integer multiple of 180 angular degrees when the plurality of sound sources are arranged in a phase order.

As an example, the sound signal emitting means may generate a first synthesized sound obtained by synthesizing the plurality of sound sources having different frequencies, select a section from a range in which an amplitude of the first synthesized sound is smaller than a reference value to generate a second synthesized sound, and use the second synthesized sound to set the emission sound signal and to emit the emission sound signal to the target space.

According to the present disclosure as described above, a sound signal capable of fully utilizing output performance of a sound signal emitting unit is provided, and thus correctness and reliability of determining a condition of a target space may be increased.

In particular, when a synthesized sound having a plurality of frequency components is set, it is possible to fully utilize the output performance of the speaker in terms of individual frequencies of the synthesized sound.

Furthermore, since the output of individual frequency components of the emitted sound is increased, an SN ratio and a detection distance may be increased, and power consumption of the apparatus may also be reduced while the overall device manufacturing cost may be reduced.

Effects of the present disclosure are not limited to those mentioned above, and other effects not mentioned will be clearly understood by those of ordinary skill in the art from the description below.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinafter, preferred embodiments of the present disclosure will be described in detail with reference to the accompanying drawings, but the present disclosure is not limited or limited by the embodiments.

In order to explain the present disclosure, the operational advantages of the present disclosure, and the objectives achieved by the practice of the present disclosure, preferred embodiments of the present disclosure are exemplified below and will be described with reference thereto.

The terminology used herein is for the purpose of describing particular embodiments only and is not intended to limit the present disclosure. Singular forms are intended to include plural forms unless the context clearly indicates otherwise. It will be further understood that the terms "comprises" or "have" used in this specification specify the presence of stated features, steps, operations, components, parts, or a combination thereof, but do not preclude the presence or addition of one or more other features, numerals, steps, operations, components, parts, or a combination thereof.

In describing the present disclosure, if it is determined that a detailed description of a related known configuration or function may obscure the gist of the present disclosure, the detailed description thereof will be omitted.

The present disclosure provides a technology in which a space monitoring apparatus using a sound to determine a spatial condition sets a synthesized sound having a plurality of frequency components to utilize the performance of a speaker efficiently and emits the sound signal to monitor the spatial condition.

Figure 2:
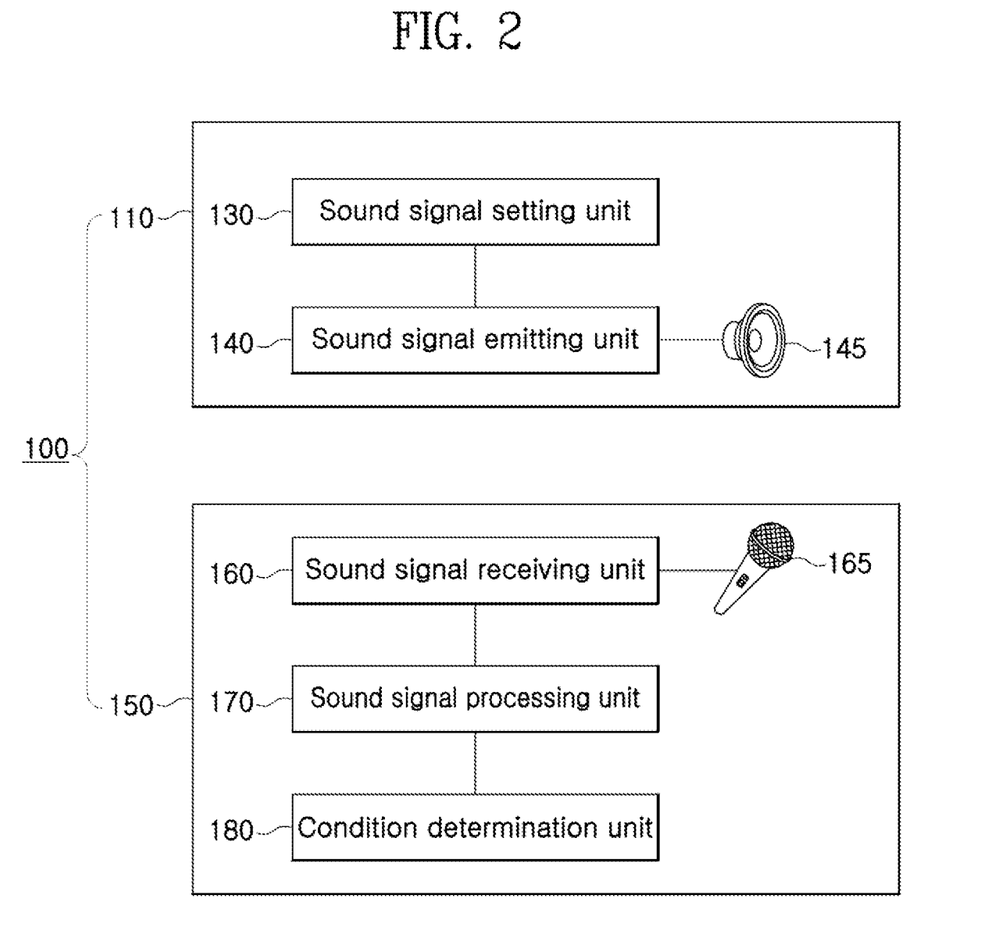
FIG. 2 is a block diagram illustrating a configuration diagram for an embodiment of the space monitoring apparatus according to the present disclosure.

FIG. 2 is a block diagram illustrating a configuration diagram for an embodiment of the space monitoring apparatus according to the present disclosure.

The space monitoring apparatus 100 according to the present disclosure may include a sound signal emitting means 110 and a spatial condition detection means 150.

The sound signal emitting means 110 and the spatial condition detection means 150 may be configured as separate devices separated from each other and disposed at positions spaced apart from each other in a target space or may be configured as a single device to be disposed at the same location in a target space.

The sound signal emitting means 110 may include a sound signal setting unit 130, a sound signal emitting unit 140, and the like.

The sound signal setting unit 130 may include a sound generator configured to generate a sound source. The sound source generated may be a digital sound source in the form of a PCM. Preferably, the sound signal setting unit 130 may generate a plurality of sound sources having different frequencies and may generate a synthesized sound by using a plurality of sound sources having different frequencies.

As an embodiment, when using a plurality of sound sources having different frequencies to generate a synthesized sound, the sound signal setting unit 130 may set each of the plurality of sound sources to allow each of the plurality of sound source to have a different phase.

As an example, when arranging a plurality of sound sources in a frequency order or an arbitrary order, the sound signal setting unit 130 may set phases to allow arrangement of phase difference between the sound sources to form an arithmetic progression, thereby generating a plurality of sound sources. Alternatively, when arranging the plurality of sound sources in a phase order, the sound signal setting unit 130 may set phases so that a sum of each phase difference is an integer multiple of 180 angular degrees, thereby generating a plurality of sound sources.

That is, the sound signal setting unit 130 may generate a sound source in which phase difference between a plurality of sound sources are adjusted.

As another example, the sound signal setting unit 130 may generate a plurality of sound sources having different frequencies, adjust a phase difference for each sound source through a phase shift, and use the plurality of sound sources to generate a synthesized sound.

For example, the sound signal setting unit 130 may generate a plurality of sound sources having different frequencies and adjust a phase of each of the plurality of sound sources through phase shift for the plurality of sound sources. At this time, when arranging the plurality of sound sources in a phase order, phase shift is performed for each of the plurality of sound sources so that arrangement of each phase difference forms an arithmetic progression, or when arranging the plurality of sound sources in a phase order, phase shift is performed for each of the plurality of sound sources so that a sum of each phase difference is an integer multiple of 180 angular degrees.

In addition, the sound signal setting unit 130 may set, as a sound signal to be emitted, the synthesized sound in which the phase difference between the plurality of sound sources are adjusted as described above, and may provide the set sound signal to the sound signal emitting unit 140.

As another embodiment, the sound signal setting unit 130 may synthesize a plurality of sound sources having different frequencies to generate a first synthesized sound and may select a section from a range having an amplitude smaller than a reference value in the first synthesized sound to generate a second synthesized sound.

The selected section may be a section of all ranges having the amplitude smaller than the reference value or a part of the section. For example, the selected section may be a section having a specific time interval starting from a point where the amplitude becomes smaller than the reference value or may be selected to be started from a point where the amplitude is 0 and be ended at a point where the amplitude is 0.

The sound signal setting unit 130 may set the second synthesized sound as a sound signal to be emitted and provide the set sound signal to the sound signal emission unit 140.

The sound signal emitting unit 140 may include the speaker 145 to emit sound to a target space. In this case, the sound signal emitting unit 140 may amplify or reduce the synthesized sound provided from the sound signal setting unit 130 in consideration of output performance of the speaker 145.

The sound signal emitting unit 140 may emit a sound signal through one speaker or a plurality of speakers. When the sound signal is emitted through the plurality of speakers, the same sound signal may be emitted or different sound signals may be emitted.

The spatial condition detecting means 150 may include a sound signal receiving unit 160, a sound signal processing unit 170, a condition determination unit 180, and the like.

The sound signal receiving unit 160 may include a microphone 165 to receive a sound signal in a target space. The sound signal receiver 160 may receive the sound signal through one microphone or may receive the sound signal through a plurality of microphones. In addition, the sound signal receiving unit 160 may include various measuring devices capable of measuring sound pressure, sound intensity, and the like.

The sound signal processing unit 170 may receive the sound received by the sound signal receiving unit 160 and may process the sound signal to obtain an optimal detection performance in consideration of various elements of the target space.

For example, the sound signal processing unit 170 may measure a frequency response of a space on the basis of the sound signal received by the sound signal receiving unit 160. The sound signal processing unit 170 may transform the received sound signal into a frequency domain through a Fourier transform algorithm or a fast Fourier transform algorithm to measure the frequency response of the space. As an example, the received sound signal is transformed into a sound pressure value in a frequency domain so that a sound pressure spectrum may be identified.

The condition determination unit 180 may determine a condition of the target space on the basis of the frequency response of the space. When various condition changes such as movement of an object, temperature change, movement of air, and the like occur in the target space, the received sound signal is changed accordingly and the frequency response of the space measured by using the received sound signal is also changed. The situation determination unit 180 may use whether the measured frequency response of the space has changed, the degree of change, a change pattern, and the like to determine what type of condition change has occurred in the target space.

As described above, since the space monitoring apparatus 100 according to the present disclosure sets a sound signal so that individual frequency components of the synthesized sound may effectively use the output performance of the speaker in the sound signal emitting means 110 and emits the sound signal to the target space, the spatial situation detection means 150 may promote more correct and reliable detection performance.

The present disclosure proposes a method for monitoring a spatial condition through the space monitoring apparatus as described above. Hereinafter, a space monitoring method according to the present disclosure will be described with reference to the space monitoring apparatus according to the present disclosure as described above.

Figure 3:
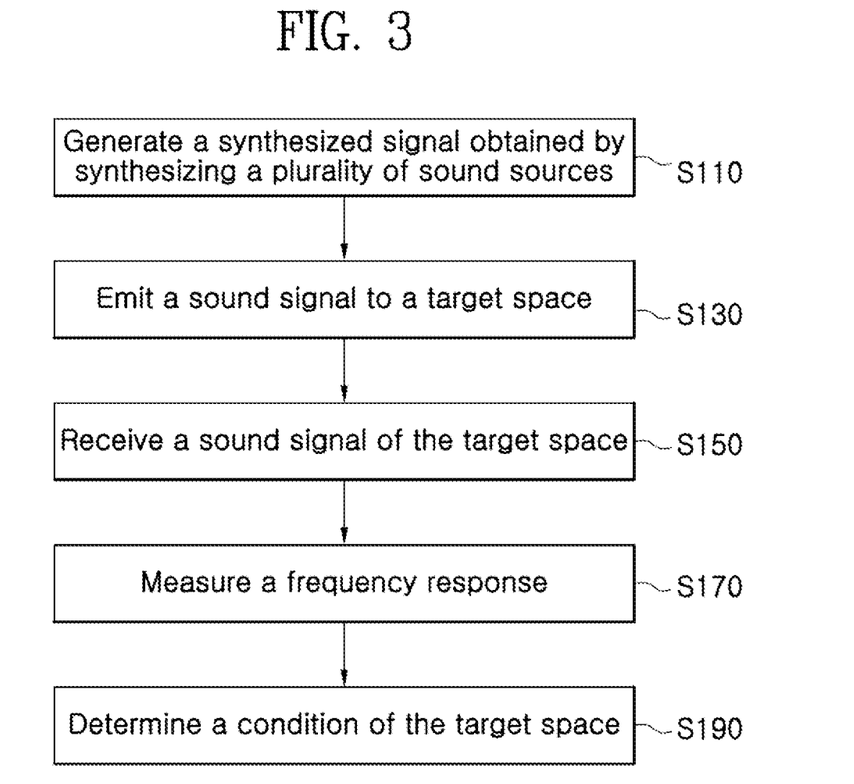
FIG. 3 is a flowchart of an embodiment of a space monitoring method according to the present disclosure.

FIG. 3 is a flowchart of an embodiment of a space monitoring method according to the present disclosure.

The sound signal emitting means 110 generates a synthesized sound obtained by synthesizing a plurality of sound sources (S110). In this case, the sound signal emitting means 110 may generate a synthesized sound allowing individual frequency components to fully utilize output performance of a speaker.

The sound signal emitting means 110 may emit a sound signal of the synthesized sound to a target space (S130).

The spatial condition detection means 150 may receive a sound signal of the target space (S150).

The spatial condition detection means 150 may measure a frequency response of the space on the basis of the received sound signal (S170). Here, the spatial condition detection means 150 may transform the received sound signal into a frequency domain through a Fourier transform algorithm or a fast Fourier transform algorithm to measure the frequency response of the space.

The spatial condition detection means 150 may determine the condition of the target space on the basis of the measured frequency response of the space (S190). The spatial condition detection means 150 may use whether the measured frequency response of the space is changed, the degree of change, a change pattern, and the like to determine what kind of condition change has occurred in the target space.

In the space monitoring method according to the present disclosure, a synthesized sound is set to allow individual frequency components to fully utilize output performance of a speaker and the synthesized sound is emitted to the target space as an emission sound so that the condition of the target space may be detected more accurately and reliably. Hereinafter, a process of setting the synthesized sound in the space monitoring method according to the present disclosure will be described in more detail through a more specific embodiment.

As a method of setting a synthesized sound in the present disclosure, a first embodiment proposes a method of generating a synthesized sound through adjustment of a phase difference of a sound source to expand an amplitude of individual frequency components of an emission sound of a speaker and a second embodiment proposes a method of selecting a section having an amplitude of a predetermined level range to regenerate a synthesized sound so that the amplitude is evenly distributed.

Figure 4:
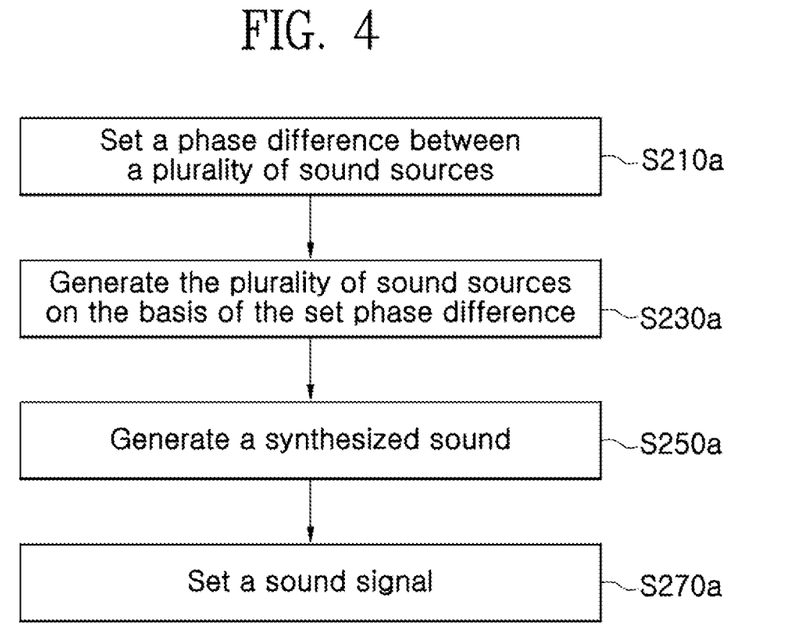
FIG. 4 is a flowchart of a first embodiment of setting a synthesized sound in a space monitoring method according to the present disclosure.

FIG. 4 is a flowchart of a first embodiment of setting a synthesized sound in a space monitoring method according to the present disclosure.

When generating a plurality of sound sources having different frequencies, the sound signal setting unit 130 may set a phase difference between the plurality of sound sources (S210a).

As an example, when arranging the plurality of sound sources in a frequency order or an arbitrary order, the phase for each sound source may be set to allow arrangement of the phase difference between the sound sources to form an arithmetic progression.

Alternatively, when arranging the plurality of sound sources in a phase order, the phases for each sound source may be set so that a sum of the phase differences is an integer multiple of 180 angular degrees.

For example, the phase for each sound source may be set on the basis of a phase calculated through [Equation 1] below.

$$\phi_k = \frac{2\pi}{N(N+1)} k(k-1), k = 1, 2 \ldots N \qquad \text{[Equation 1]}$$

Wherein, $\phi_k$ denotes the phase of kth sound source among sound sources having different frequencies and N denotes the number of sound sources.

The sound signal setting unit 130 may generate a plurality of sound sources on the basis of the set phase (S230a) and synthesize a plurality of sound sources whose phase difference is adjusted to generate a synthesized sound (S250a).

That is, in the first embodiment, when the plurality of sound sources having different frequencies are generated, the sound source in which a phase difference between the plurality of sound sources is adjusted may be generated.

In addition, the sound signal setting unit 130 may set the sound signal to be emitted as the synthesized sound in which the phase of each frequency component is adjusted (S270a) and provide the sound signal to the sound signal emitting unit 140.

Figure 5:
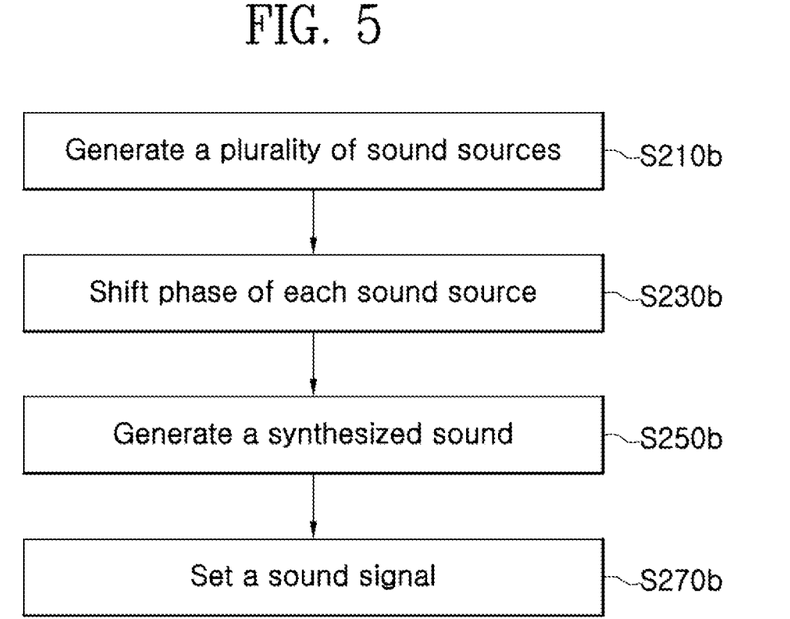
FIG. 5 is a flowchart of a modified embodiment of the first embodiment for setting a synthesized sound in the space monitoring method according to the present disclosure.

FIG. 5 is a flowchart of a modified embodiment of the first embodiment for setting a synthesized sound in the space monitoring method according to the present disclosure.

The sound signal setting unit 130 may generate a plurality of sound sources having different frequencies (S210b).

The sound signal setting unit 130 may adjust a phase difference between the plurality of sound sources through phase shift for the plurality of generated sound sources (S230b).

As an example, when the plurality of sound sources are arranged in a frequency order or an arbitrary order, a phase shift may be performed for each sound source so that arrangement of phase differences between the sound sources forms an arithmetic progression.

Alternatively, when the plurality of sound sources are arranged in a phase order, a phase shift may be performed for each sound source so that the sum of the phase differences between the sound sources is an integer multiple of 180 angular degrees.

For example, the phase shift for each sound source may be performed on the basis of the phase calculated through [Equation 1].

The sound signal setting unit 130 may synthesize a plurality of phase-shifted sound sources to generate a synthesized sound (S250b).

In other words, in a modified example of the first embodiment, after a plurality of sound sources having different frequencies are generated, a phase difference between the plurality of sound sources may be adjusted through a phase shift for each sound source.

In addition, the sound signal setting unit 130 may set the sound signal to be emitted as the synthesized sound in which the phase of each frequency component is adjusted (S270b) and provide the sound signal to the sound signal emitting unit 140.

Through the first embodiment according to the present disclosure and the modified examples of the first embodiment, the amplitude of each individual frequency included in the sound emitted by the speaker may be extended. As the volume of the emitted sound increases, the amplitude of the individual frequency components included in the emitted sound increases in proportion to it. However, the volume of the emitted sound may be limited due to the limitation of the output performance of the speaker. However, as described below, through the present disclosure, the amplitude of each individual frequency included in the emitted sound may be extended while the volume of the maximum peak of the emitted sound is fixed.

As an example of adjusting the phase for each of the plurality of sound sources in the present disclosure, it will be described with reference to FIGS. 6 and 7.

The case where there are 15 sound sources having the same amplitude as 1 V, but with different frequencies, in which the frequency of each sound source starts from 4000 Hz and has an interval of 4 Hz, will be described as an example.

Figure 6:
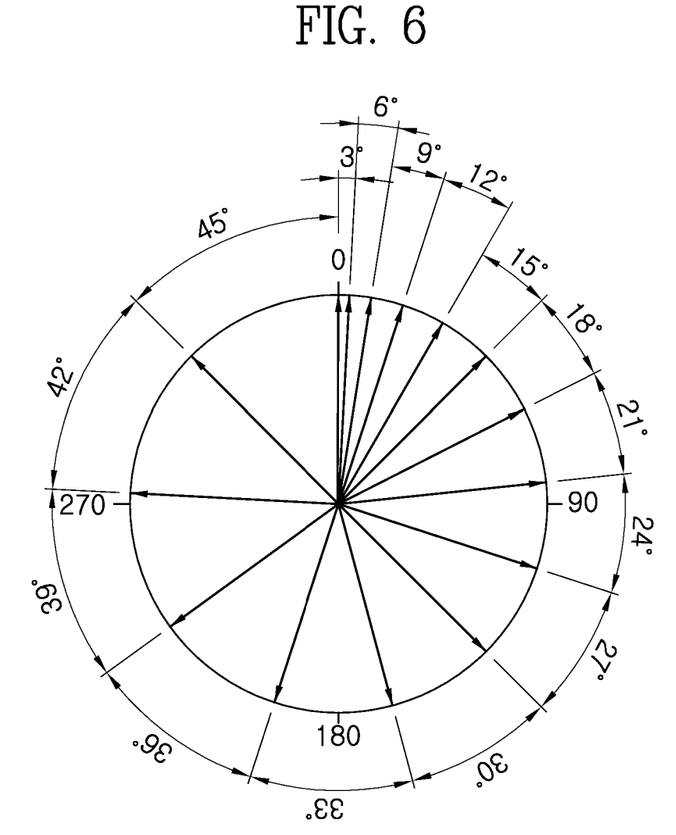
FIG. 6 is a view illustrating an example of adjusting the phase difference for a plurality of sound sources in the present disclosure.

As illustrated in FIG. 6, for the plurality of sound sources having different frequencies, a second frequency may be set to have a phase difference of 3 angular degrees from a first frequency on the basis of the first frequency, and a third frequency may be set to have a phase difference of 6 angular degrees from the second frequency. Also, a fourth frequency may be set to have a phase difference of 9 angular degrees from the third frequency.

Phase setting for each frequency may be performed so that the phase differences between the 15 frequencies are respectively 3, 6, 9, 12, 15, 18, 21, 24, 27, 30, 33, 36, 38, 42, and 45 angular degrees.

The sum of the phase differences between the plurality of frequencies forms 360 angular degrees, and the phase differences between the frequencies form an arithmetic progression.

Figure 7:
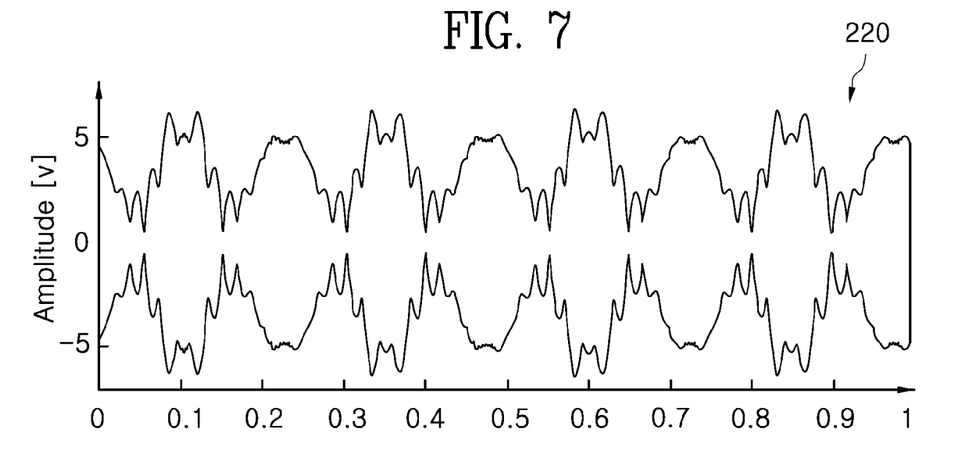
FIG. 7 is a view illustrating an example of a synthesized sound whose phase difference is adjusted through the present disclosure.

When the 15 sound sources whose phase has been adjusted as described above are synthesized, a synthesized sound 220 having an envelope as illustrated in FIG. 7 is obtained.

When the 15 sound sources are synthesized without applying the present disclosure, the synthesized sound 210 as illustrated in FIG. 1 will be generated. Since the maximum amplitude of the synthesized sound 210 in FIG. 1 is 15 V, if the maximum output performance of the speaker is 1 V, the synthesized sound 210 should be output in a size divided by 15 according to the output performance of the speaker.

However, when the first embodiment and the modified example of the first embodiment according to the present disclosure are applied, the maximum amplitude of the synthesized sound 220 as illustrated in FIG. 7 is 6.3 V, so the synthesized sound 220 may be output in a size divided by 6.3 when output through the speaker having the maximum output performance of 1 V.

In other words, in the synthesized sound 220 of FIG. 7 to which the present disclosure is applied, the amplitude of each individual frequency component increases by 2.38 times from 1/15 to 1/6.3 in comparison with the synthesized sound 210 of FIG. 1.

As such, since the synthesized sound to which the present disclosure is applied is dispersed while the phases of individual frequencies are optimized, the amplitude of individual frequencies included in the emitted sound may be increased, and thus the present disclosure provides advantages of increasing a detection distance and SNR of a space monitoring apparatus.

Figure 8:
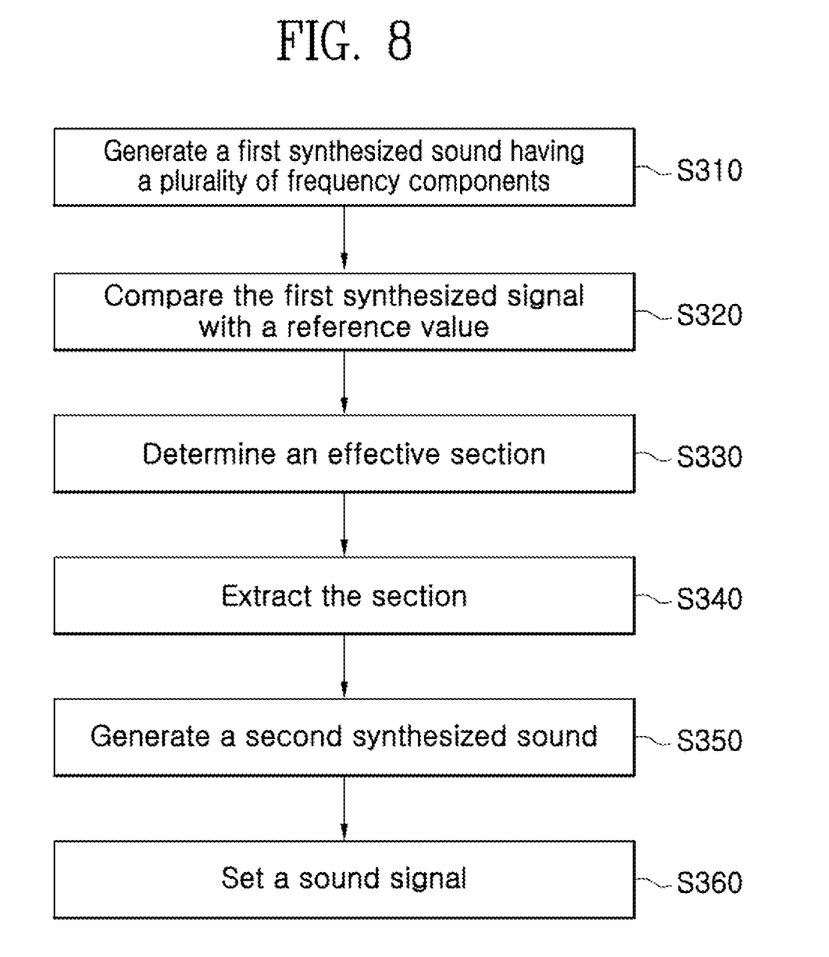
FIG. 8 is a flowchart of a second embodiment of setting a synthesized sound in a space monitoring method according to the present disclosure.

FIG. 8 is a flowchart of a second embodiment of setting a synthesized sound in a space monitoring method according to the present disclosure.

The sound signal setting unit 130 may synthesize a plurality of sound sources having different frequencies to generate a first synthesized sound (S310).

The sound signal setting unit 130 may compare the amplitude of the first synthesized sound with a reference value (S320) to determine a section having an amplitude smaller than the reference value as an effective section (S330).

A section may be selected and extracted from the effective section of the first synthesized sound (S340), and a second synthesized sound may be generated on the basis of the selected section (S350).

In addition, the sound signal setting unit 130 may set the sound signal to be emitted as the second synthesized sound (S270b) and provide the sound signal to the sound signal emission unit 140.

As an example of extracting a section from the first synthesized sound and regenerating the second synthesized sound with evenly distributed amplitudes according to the present disclosure, an example will be described with reference to FIGS. 9 to 11.

Figure 9:
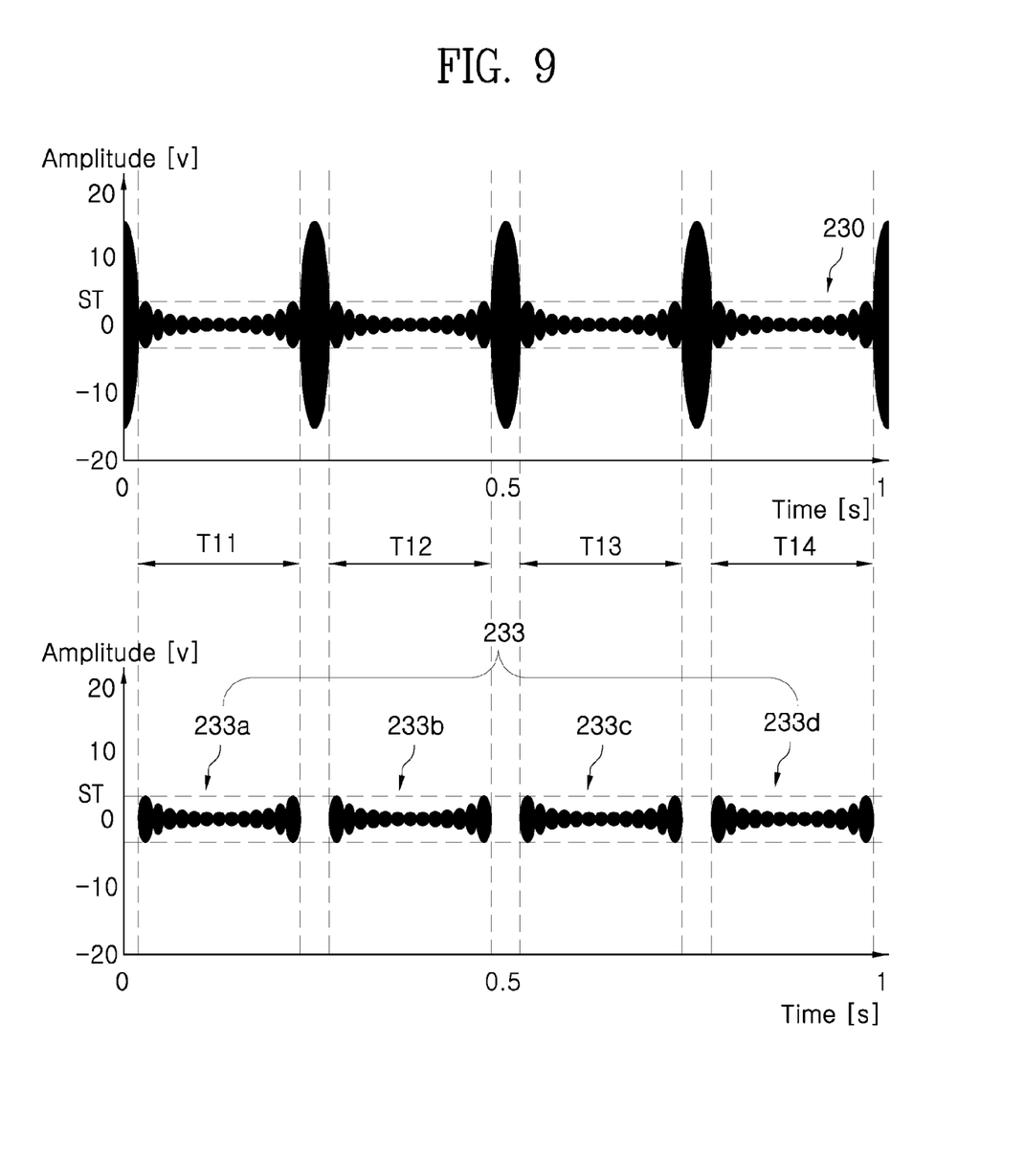
FIGS. 9 to 11 are views illustrating an example of extracting a section from the first synthesized sound and regenerating the second synthesized sound with evenly distributed amplitudes according to the present disclosure.
Figure 10:
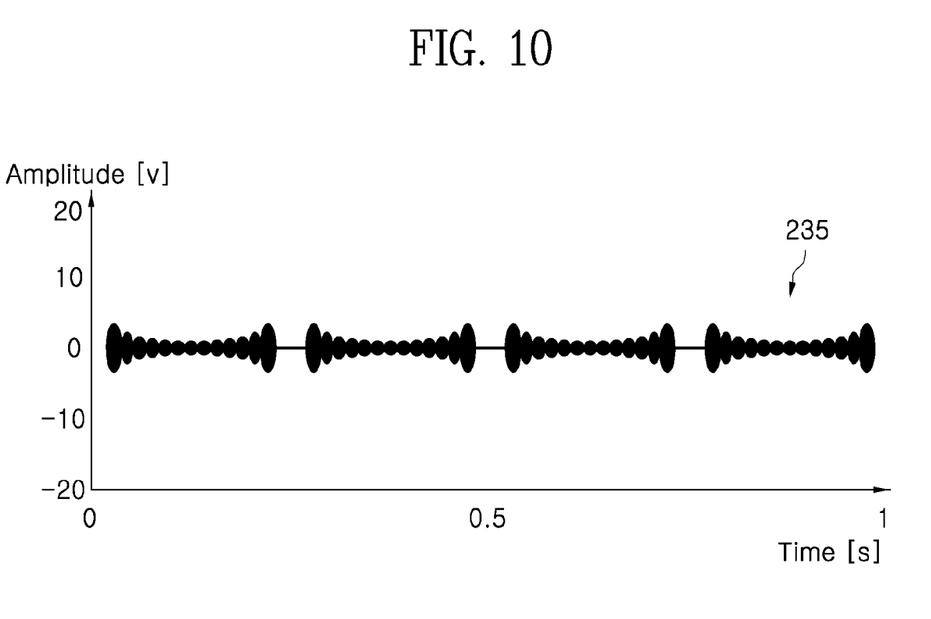
Figure 11:
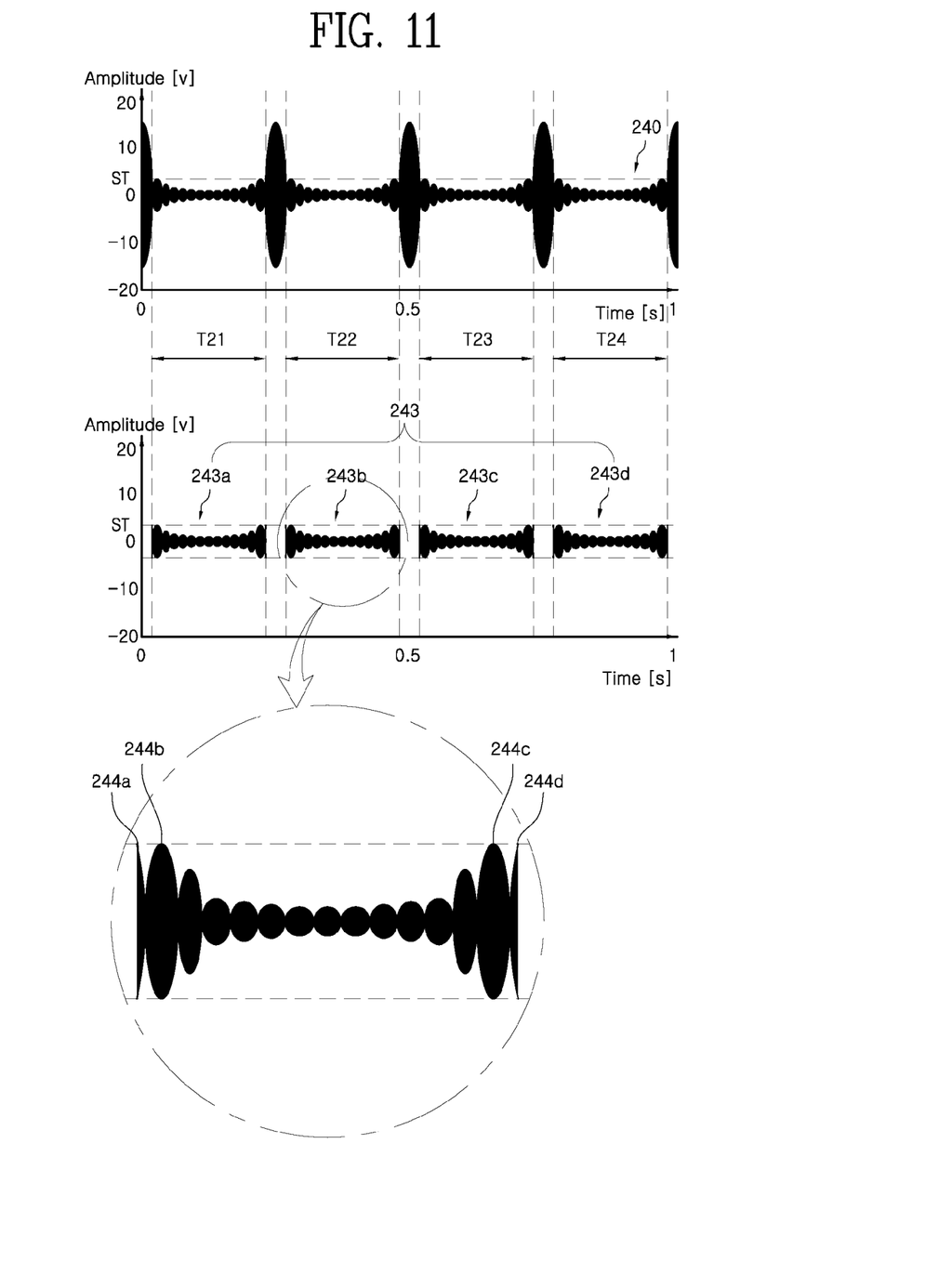

FIGS. 9 to 11 are views illustrating an example of extracting a section from the first synthesized sound and regenerating the second synthesized sound with evenly distributed amplitudes according to the present disclosure.

FIGS. 9 and 10 illustrate an example of setting a sound signal by adjusting the synthesized sound according to the present disclosure.

When the first synthesized sound 230 is generated by synthesizing a plurality of sound sources having different frequencies, looking at the envelope of the first synthesized sound 230, it may be seen that the difference between the largest amplitude and the second largest amplitude is remarkably shown, but it may be seen that the difference between the second largest amplitude and the remaining amplitudes is reduced.

In the example of FIG. 9, the magnitude of the second largest amplitude in the envelope is set as a reference value ST, and an effective section having a magnitude smaller than or equal to the reference value ST is determined so that predetermined sections T11, T12, T13, and T14 are selected and extracted from the effective section.

In this case, the reference value ST may be changed into and set as the magnitude of the third largest amplitude or the magnitude of the fourth largest amplitude in the envelope as necessary in consideration of magnitude difference between all amplitudes.

In addition, as the section in FIG. 9, a section starting from a point having an amplitude of 0 and ending at a point having an amplitude of 0 within an effective section may be selected. In this case, predetermined sections T11, T12, T13, and T14 including waveforms 233a, 233b, 233c, and 233d with amplitude other than a waveform with the largest amplitude on the basis of the envelope may be selected and extracted. Then, the second synthesized sound 233 is generated by using the extracted sections T11, T12, T13, and T14.

The second synthesized sound 233 may be set as the sound signal 235 to be emitted to the target space as illustrated in FIG. 10. When the sound signal 235 is set as the second synthesized sound 233, a region between the predetermined sections T11, T12, T13, and T14 may be treated as silence or a specific sound having a size smaller than or equal to the reference value ST may be inserted thereinto. Furthermore, the time interval between the sections T11, T12, T13, and T14 may be arbitrarily adjusted, or, for example, sound may be emitted to the target space by using only one section T11.

FIG. 11 illustrates another example of selecting a section from among effective sections.

In the example of FIG. 11, similar to the example of FIG. 9, the magnitude of the second largest amplitude on the basis of the envelope of the first synthesized sound 230 generated by synthesizing a plurality of sound sources with different frequencies is set as the reference value ST. However, the difference from FIG. 9 is that T21, T22, T23, and T24 are extracted by selecting all effective sections having a magnitude equal to or smaller than the reference value ST. Since all of the effective sections are selected in FIG. 11, unlike in FIG. 9, portions 244a and 244d having the largest amplitudes on the basis of the envelope are also included in the predetermined section.

Alternatively, a predetermined section formed of only portions 244a, 244b, and 244c may be selected in FIG. 11 while excluding the portion 244d.

As such, since a synthesized sound in which the amplitude of the envelope is evenly distributed is emitted as a sound signal according to the present disclosure, individual frequency components included in the emitted sound may fully utilize output performance of a speaker, thus correctness and reliability of detecting a condition of a target space may be increased.

Although the preferred embodiment of the present disclosure has been described for illustrative purposes, those skilled in the art will appreciate that various modifications, additions and substitutions are possible, without departing from the scope and spirit of the invention as disclosed in the accompanying claims. Therefore, the embodiments described in the present disclosure are not intended to limit the technical spirit of the present disclosure, but to explain, and the technical spirit of the present disclosure is not limited by these embodiments. The protection scope of the present disclosure should be construed by the following claims, and all technical ideas within the scope equivalent thereto should be construed as being included in the scope of the present disclosure.

What is claimed is:

1. A space monitoring method using a sound signal, the method comprising:
   emitting a sound signal, which uses a synthesized sound obtained by synthesizing a plurality of sound sources having difference frequencies to emit a sound signal to a target space;
   receiving a sound signal, which receives the sound signal of the target space;
   measuring a frequency response, which measures a frequency response of a space on the basis of the received sound signal; and
   determining a spatial condition, which determines a condition of the target space on the basis of the measured frequency response of the space,
   wherein the emitting sound signal sets a plurality of sound sources to allow the plurality of sound sources to have different phases and uses the synthesized sound obtained by synthesizing the plurality of sound sources to set an emission sound signal.

2. The method of claim 1, wherein the emitting the sound signal sets the plurality of sound sources so that an arrangement of phase difference between the sound sources forms an arithmetic progression when the plurality of sound sources are arranged in a phase order.

3. The method of claim 1, wherein the emitting the sound signal sets the plurality of sound sources so that a sum of phase difference between the sound sources is an integer multiple of 180 angular degrees when the plurality of sound sources are arranged in a phase order.

4. The method of claim 1, wherein the emitting the sound signal comprises:
   generating a first synthesized sound obtained by synthesizing the plurality of sound sources having different frequencies;
   generating a second synthesized sound by selecting a section from a range in which an amplitude of the first synthesized sound is smaller than a reference value; and
   setting the emission sound signal by using the second synthesized sound.

5. A space monitoring apparatus using a sound signal, the apparatus comprising:
   a sound signal emitting means configured to generate a synthesized sound obtained by synthesizing a plurality of sound sources having different frequencies to emit the sound signal to a target space; and
   a spatial condition detection means configured to receive the sound signal of the target space to measure a frequency response of the target space and configured to determine a condition of the target space on the basis of the measured frequency response of the target space,
   wherein the sound signal emitting means sets the plurality of sound sources to allow the plurality of sound sources to have different phases and uses a synthesized sound obtained by synthesizing the plurality of sound sources to set the emission sound signal and to emit the emission sound signal to the target space.

6. The apparatus of claim 5, wherein the sound signal emitting means sets the plurality of sound sources so that an arrangement of phase difference between the sound sources forms an arithmetic progression when the plurality of sound sources are arranged in a phase order.

7. The apparatus of claim 6, wherein the sound signal emitting means sets the plurality of sound sources so that a sum of phase difference between the sound sources is an integer multiple of 180 angular degrees when the plurality of sound sources are arranged in a phase order.

8. The apparatus of claim 5, wherein the sound signal emitting means generates a first synthesized sound obtained by synthesizing the plurality of sound sources having different frequencies, selects a section from a range in which an amplitude of the first synthesized sound is smaller than a reference value to generate a second synthesized sound, and uses the second synthesized sound to set the emission sound signal and to emit the emission sound signal to the target space.

* * * * *